(12) United States Patent
Kubota et al.

(10) Patent No.: US 8,477,259 B2
(45) Date of Patent: Jul. 2, 2013

(54) LIQUID CRYSTAL DISPLAY DEVICE

(75) Inventors: Hidenao Kubota, Yokohama (JP); Nobuo Masuoka, Chigasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 805 days.

(21) Appl. No.: 12/608,083

(22) Filed: Oct. 29, 2009

(65) Prior Publication Data

US 2010/0110329 A1 May 6, 2010

(30) Foreign Application Priority Data

Oct. 30, 2008 (JP) .................................. 2008-280032

(51) Int. Cl.
 *G02F 1/13357* (2006.01)
 *F21V 8/00* (2006.01)

(52) U.S. Cl.
 USPC ............... 349/65; 349/58; 362/612; 362/613; 362/628; 362/631

(58) Field of Classification Search
 USPC .............. 349/58, 65; 362/612, 613, 623, 625, 362/626, 628, 629, 97.2, 97.3
 See application file for complete search history.

(56) References Cited

U.S. PATENT DOCUMENTS

| | | | |
|---|---|---|---|
| 6,055,029 A * | 4/2000 | Kurihara et al. | 349/65 |
| 6,419,369 B1 | 7/2002 | Itoh | |
| 7,771,104 B2 * | 8/2010 | Iwasaki | 362/628 |
| 2001/0015483 A1 * | 8/2001 | Takaishi | 257/678 |
| 2004/0085751 A1 | 5/2004 | Okuwaki et al. | |
| 2005/0052590 A1 | 3/2005 | Ochiai | |
| 2008/0175023 A1 | 7/2008 | Lee et al. | |

FOREIGN PATENT DOCUMENTS

| | | |
|---|---|---|
| CN | 1499261 | 5/2004 |
| CN | 101246281 | 8/2008 |
| JP | 04-029289 | 1/1992 |
| JP | 06-230376 | 8/1994 |
| JP | 07-151922 | 6/1995 |
| JP | 2001-126523 | 5/2001 |
| JP | 2004-079488 | 3/2004 |
| JP | 2005-84097 | 3/2005 |
| JP | 2006-010789 | 1/2006 |
| JP | 2006-066171 | 3/2006 |
| JP | 2008-130336 | 6/2008 |
| WO | WO 2004/038283 | 5/2004 |

OTHER PUBLICATIONS

Chinese Office Action in counterpart application, issued Apr. 1, 2013 with English Language translation.

* cited by examiner

*Primary Examiner* — Dung Nguyen
*Assistant Examiner* — Tai Duong
(74) *Attorney, Agent, or Firm* — Antonelli, Terry, Stout & Kraus, LLP.

(57) ABSTRACT

In order to achieve a liquid crystal display device for TV with a reduced thickness, light weight, and uniform brightness, a liquid crystal display panel and a backlight are housed in a mold. In the backlight, light emitting diodes are provided in a frame-like flexible wiring substrate, in which plural the light emitting diodes are provided on each of four side surfaces of a light guide panel. A distance between the light emitting diodes in the central portion of each side of the light guide panel is small, while a distance in the corners of each side is large.

7 Claims, 13 Drawing Sheets

LIQUID CRYSTAL DISPLAY DEVICE

CLAIM OF PRIORITY

The present application claims priority from Japanese Patent Application JP 2008-280032 filed on Oct. 30, 2008, the content of which is hereby incorporated by reference into this application.

FIELD OF THE INVENTION

The present invention relates to a relatively large liquid crystal display device used for TV and the like, and more particularly to a liquid crystal display device with a reduced thickness and uniform screen brightness.

BACKGROUND OF THE INVENTION

In a liquid crystal display device, a TFT substrate in which pixel electrodes, thin film transistors (TFTs), and the like, are formed in matrix, is disposed facing a color filter substrate in which color filters, and the like are formed at positions corresponding to the pixel electrodes of the TFT substrate. There is provided a liquid crystal between the TFT substrate and the color filter substrate. The liquid crystal display device controls the transmittance of light of the liquid crystal molecules for each pixel to form an image.

The liquid crystal display device can have a flat screen and a reduced thickness, allowing it to be used in a wide range of applications including small display devices such as mobile phone and digital still camera (DSC), as well as large display device such as TV. In general, the liquid crystal display device for TV uses a direct-type backlight with a cold cathode fluorescent lamp (CFL), which is a light source, provided under a liquid crystal display panel.

The direct-type backlight can easily increase the screen brightness. However, the provision of the direct-type backlight increases the thickness of the liquid crystal display device. In order to reduce the thickness of the liquid crystal display device, it is possible to use a backlight of a side light system in which cold cathode fluorescent lamps are provided on the sides of a light guide panel constituting the backlight of the liquid crystal display device.

Examples of such a liquid crystal display device using the side light system that provides cold cathode fluorescent lamps on the sides of the light guide panel, can be found in JP-A No. 126523/2001, JP-A No. 10789/2006, and JP-A 151922/1995. JP-A No. 126523/2001 describes a configuration of the side light system that provides cold cathode fluorescent lamps on the four sides of the light guide panel while stabilizing the position of the light guide panel in a housing member, for example, formed by a mold (hereinafter the housing member will be referred to as "mold").

JP-A No. 10789/2006 describes a configuration of the side light system that uses a U-shaped cold cathode fluorescent lamp to surround the three sides of the light guide panel. Further, JP-A 151922/1995 describes a configuration of the side light system that uses two L-shaped cold cathode fluorescent lamps to surround the four sides of the light guide panel.

In a liquid crystal display device of side light system with cold cathode fluorescent lamps provided on the sides of a light guide panel, the thickness can be further reduced compared to the thickness of a direct-type liquid crystal display device in which a cold cathode fluorescent lamp is provided under a liquid display panel. However, it is difficult to reduce the thickness enough for applications such as wall-hanging TV.

In addition, the use of the cold cathode fluorescent lamps requires an inverter circuit to reduce flicker. However, the weight of the inverter is large, which is an obstacle for applications such as wall-hanging TV.

For example, a 32 inch TV with an existing liquid crystal display device for TV has the thickness of 10 cm, and the weight of about 20 Kg excluding the stand. Thus, in order to hang the TV on a wall, the work similar to that of mounting an air conditioner is necessary.

The present invention aims to provide a thin and lightweight TV that can be hung on a wall without the need of such a large-scale work.

SUMMARY OF THE INVENTION

The present invention solves the above described problem. The specific aspects of the present invention are as follows.

(1) A liquid crystal display device includes a liquid crystal display panel, a backlight, and a mold for housing the liquid crystal display panel and the backlight. The backlight includes a light guide panel with plural light emitting diodes provided on each of four side portions of the light guide panel. A distance between the light emitting diodes in a central portion of each of the four sides is equal to or less than 80% of a distance between the light emitting diodes in the vicinity of corners of each of the four sides.

(2) In the liquid crystal display device described in (1), the light guide panel is housed in the mold, in which plural light emitting diode housing portions are formed on each side of the inside of the mold to house the light emitting diodes.

(3) In the liquid crystal display device described in (1), the light emitting diodes are provided in a frame-like flexible wiring substrate, in which plural the light emitting diodes are provided on each side of the flexible wiring substrate.

(4) In the liquid crystal display device described in (1), a thermal expansion coefficient of a base material of the flexible wiring substrate is smaller than a thermal expansion coefficient of the light guide panel.

(5) In the liquid crystal display device described in (2), when T is a temperature increase in the light emitting diode housing portions of the mold during operation, a distance between the light guide panel and the mold is equal to or more than $7\times10^{-6}T\times$(a major axis of the light guide panel) in the major axis, or $7\times10^{-6}T\times$(a minor axis of the light guide panel) in the minor axis.

(6) A liquid crystal display device includes a liquid crystal display panel, a backlight, and a mold for housing the liquid crystal display panel and the backlight. The backlight includes a light guide panel with plural light emitting diodes provided on each of four side portions of the light guide panel. A pitch of a sub pixel in the liquid crystal display panel is the same in the center and a periphery of the screen. A width of the sub pixel in the center of the screen is 10% or more greater than the width in a periphery of the screen.

(7) A liquid crystal display device includes a liquid crystal display panel, a backlight, and a mold for housing the liquid crystal display panel and the backlight. The backlight includes a light guide panel with plural light emitting diodes provided on each of four side portions of the light guide panel. A pitch of a sub pixel in the liquid crystal display panel in the center of the screen is greater than that in a periphery of the screen. A width of the sub pixel in the center of the screen is greater than that in the periphery of the screen. The transmittance of the liquid crystal display panel defined by the pitch and width of the sub pixel in the center of the screen is 10% or more greater than the transmittance in the periphery of the screen.

(8) A liquid crystal display device includes a liquid crystal display panel, a backlight, and a mold for housing the liquid crystal display panel and the backlight. The backlight includes a light guide panel with plural light emitting diodes provided on each of four side portions of the light guide panel. A pitch of a sub pixel in the liquid crystal display panel in the periphery of the screen is greater than that in the center of the screen. A width of the sub pixel is the same in the center and periphery of the screen. The transmittance of the liquid crystal display panel defined by the pitch and width of the sub pixel in the center of the screen in the center of the screen is 10% or more greater than the transmittance in the periphery of the screen.

(9) A liquid crystal display device includes a liquid crystal display panel, a backlight, and a mold for housing the liquid crystal display panel and the backlight. The backlight includes a light guide panel with plural light emitting diodes provided on each of four side portions of the light guide panel. A back surface of the light guide panel is convex toward the interior thereof, in which plane surfaces and inclined surfaces are alternately formed on the back surface of the light guide panel. An angle between the inclined surface and the plane surface is less than 45 degrees.

(10) In the liquid crystal display device described in (9), an envelope of intersections between the inclined surfaces and the plane surfaces in a cross section of the light guide panel is a straight line.

According to the present invention, in a liquid crystal display device for TV, plural light emitting diodes are provided on each of the four side surfaces of a light guide panel, in which the distance between the light emitting diodes in the central portion of each side is made smaller than that in the corners of each side. With this configuration, it is possible to achieve a thin and lightweight liquid crystal display device with little irregularity of the brightness in the display area.

According to another aspect of the present invention, plural light emitting diodes are provided on each of the four side surfaces of a light guide panel. Further, in a screen of the liquid crystal panel, the transmittance of a sub pixel in the center of the screen is made greater than the transmittance in the periphery of the screen. With this configuration, it is possible to finely set the screen brightness to be uniform both in the center and periphery of the screen.

According to still another aspect of the present invention, plural light emitting diodes are provided on each of the four side surfaces of a light guide panel. The back surface of the light guide panel is convex toward the interior thereof, which is formed by connecting plane surfaces and inclined surfaces while the angle of the inclined surface is changed depending on the position. With this configuration, it is possible to set the screen brightness to be uniform both in the center and periphery of the screen.

DETAILED DESCRIPTION OF THE PREFERRED EMBODIMENTS

Hereinafter, detailed contents of the present invention will be described in accordance with the embodiments.

First Embodiment

Figure 1:
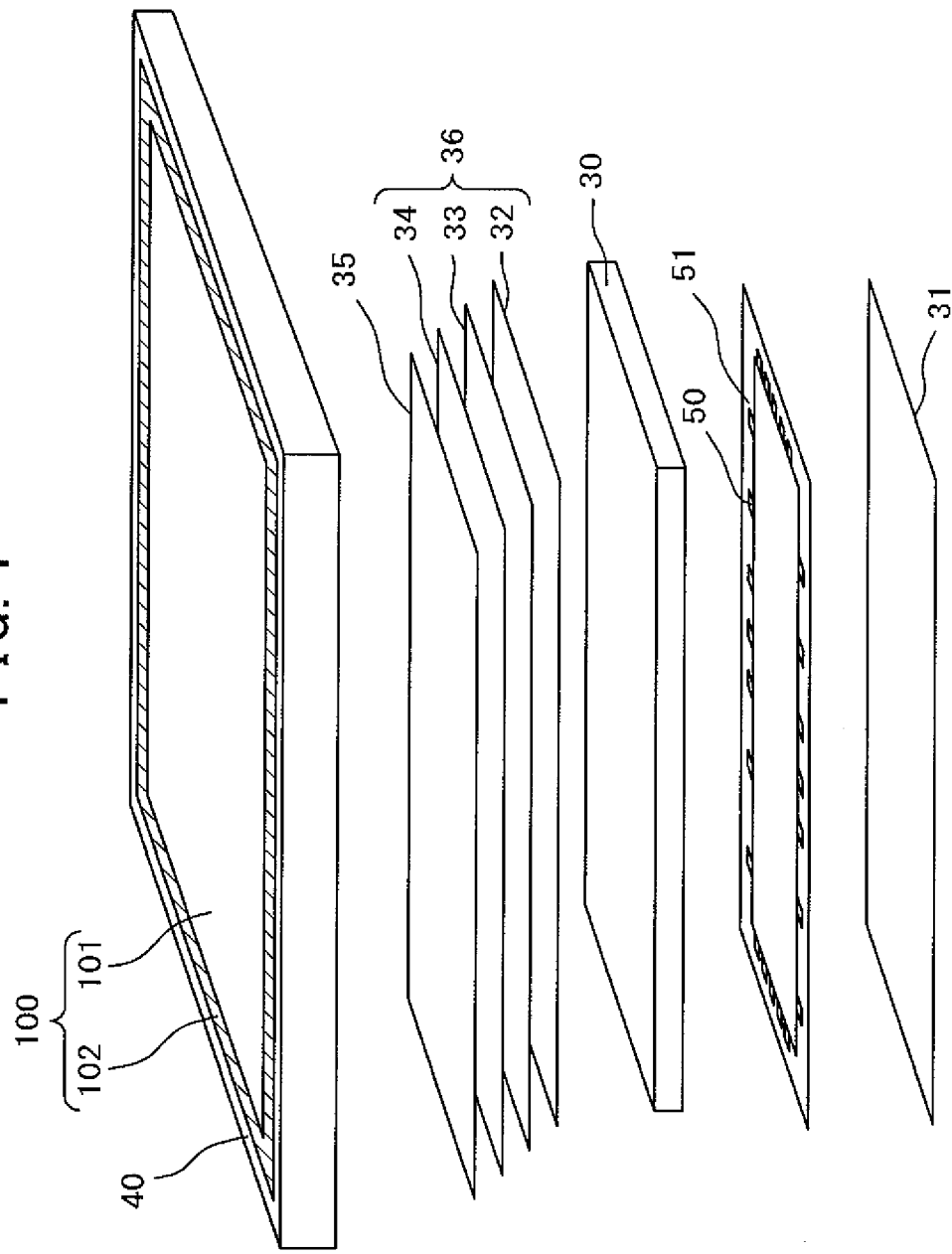
FIG. 1 is an exploded perspective view of a liquid crystal display device according to the present invention.

FIG. 1 is an exploded perspective view of a liquid crystal display device according to the present invention. In FIG. 1, a liquid crystal display panel 100 is placed within a mold 40 which is a housing member having a flame-like or box-like shape. In the present specification, the liquid crystal display panel 100 is configured to have a TFT substrate 10 and a color filter substrate 20 with a liquid crystal therebetween, in which a lower polarizing plate 11 is attached to the TFT substrate 10 and an upper polarizing plate is attached to the color filter substrate 20. In some cases, the liquid crystal display panel 100 is configured to have the TFT substrate 10 and the color filter 20 with a liquid crystal therebetween. Further, the liquid crystal display device is configured to have the liquid crystal display panel 100 in which a backlight is mounted.

In the mold 40, the liquid crystal display panel 100 is housed on the upper side and the backlight is housed on the lower side. In FIG. 1, the liquid crystal display panel 100 is placed within the mold 40, which is shown together with a display area 101 and a flame area 102. An upper polarizing plate 21 having substantially the same area as the display area 101 of the liquid crystal display panel 100 is attached to the display area 101.

Figure 2:
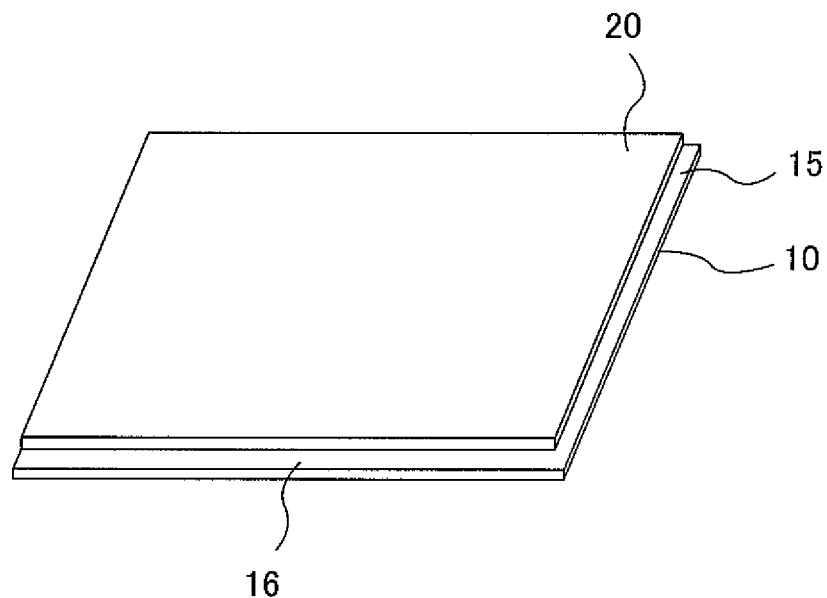
FIG. 2 is a perspective view of a liquid crystal display panel.

FIG. 2 is a perspective view of the liquid crystal display panel 100 in which the TFT substrate 10 and the color filter substrate 20 are combined through a seal portion. FIG. 2 omits the polarizing plates. In FIG. 2, the TFT substrate 10 is formed to be greater than the color filter substrate 20. For example, a scan line terminal portion 15 is formed in the end portion on the right side of the TFT substrate 10, and an image signal line terminal portion 16 is formed on the lower side of the TFT substrate 10. The scan line terminal portion 15 and the image signal line terminal portion 16 are connected with a scan line driver IC, an image signal line driver IC, and the like, through TCP (Tape Carrier Packaging) not shown, and the like, respectively.

Returning to FIG. 1, there is shown an exploded perspective view of the backlight below the mold 40. The backlight includes light emitting diodes 50 as light sources, and various optical components. Plural LEDs, which are the light sources of the backlight, are provided on each of the four sides of the light guide panel 30. The light emitting diodes 50 are set in a hollow frame-like flexible wiring substrate 51 for the light emitting diodes 50. The light guide panel 30 is inserted into the hollow portion of the flexible wiring substrate 51.

The light guide panel 30 has a role to direct light from the light emitting diodes 50 from the sides of the light guide panel 30, toward the liquid crystal display panel 100. In order to direct the light emitted downward from the light guide panel 30 toward the liquid crystal display panel 100, a reflection sheet 31 is attached to the lower side of the light guide plate 30. The reflection sheet is formed from a metal with high reflectance such as Al.

On the light guide panel 30, optical sheets 36 are placed. The optical sheets 36 include, for example, a lower diffusion sheet 32, a lower prism sheet 33, an upper prism sheet 34, and an upper diffusion sheet 35, from the side of the light guide panel 30. The role of the optical sheets will be described later. These optical components for the backlight are superimposed on one another and are housed in the mold 40.

Figure 3:
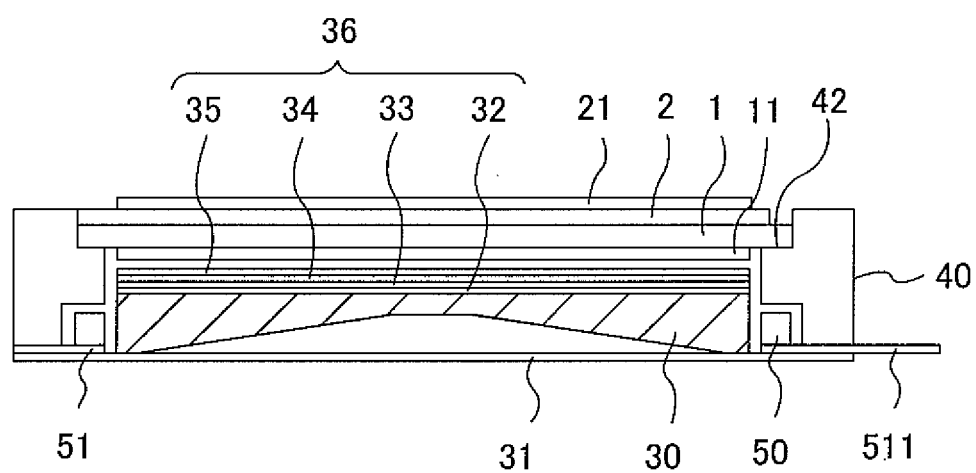
FIG. 3 is a cross-sectional view of the liquid crystal display device according to the present invention.
Figure 4:
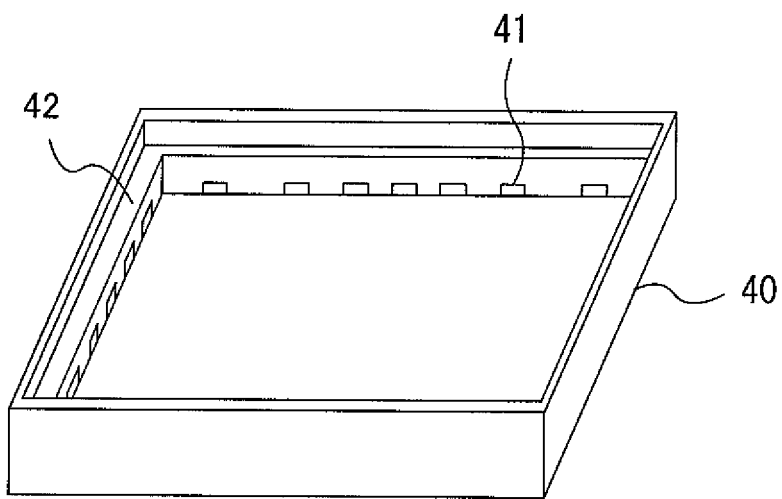
FIG. 4 is a perspective view of a mold used in the present invention.

FIG. 3 is a cross-sectional view of the assembled liquid crystal display device. In FIG. 3, the liquid crystal display panel 100 and the backlight are housed in the mold 40. FIG. 4 is a perspective view of the mold 40. The mold 40 has a square frame shape formed from, for example, polycarbonate. A step portion 42 is formed inside the mold 40. The TFT substrate 10 of the liquid crystal display panel 100 is bonded and fixed to the step portion 42 by an adhesive material and the like. Incidentally, the present embodiment exemplifies the case in which the mold formed from a resin such as polycarbonate is used as the housing material. However, it is also possible to use a metal such as, for example, aluminum, which is formed into a frame or box shape as the housing material.

Plural concave portions are formed on each side of the lower inside of the mold 40, serving as light emitting diode housing portions 41. The light guide panel 30 is inserted into the mold 40. The side surfaces of the light guide panel 30 are placed facing the light emitting diode housing portions 41. Thus, the light from the light emitting diodes 50 is input from the side portions of the light guide panel 30.

Returning to FIG. 3, the liquid crystal display panel 100 is placed on the upper side of the mold 40. The TFT substrate 10 of the liquid crystal display panel 100 is bonded by an adhesive tape (not shown) or the like, to the step portion 42 formed inside the mold 40. On the TFT substrate 10, the color filter substrate 20 is placed, with a liquid crystal provided between the TFT substrate 10 and the color filter substrate 20. The upper polarizing plate 21 is attached to the top of the color filter substrate 20, and the lower polarizing plate 11 is attached to the bottom of the TFT substrate 10. The backlight housed in the lower side of the mold 40 includes the light emitting diodes 50 as the light sources, and the various optical components. The concave portions are formed in the inner wall of the mold 40, serving as the light emitting diode housing portions 41 to house the light emitting diodes 50. As shown in FIG. 1, the light emitting diodes 50 are provided in the frame-like flexible wiring substrate 51. Then, a terminal portion 511 extending from the flexible wiring substrate 51 to the outside of the mold 40 is connected to an external circuit.

In FIG. 3, the light emitting diodes 50 are provided on the sides of the light guide panel 30. The light guide panel 30 has a role to direct the light from the light emitting diodes 50 toward the liquid crystal display panel 100. In order to obtain a uniform brightness in the liquid crystal display panel 100, the cross section of the light guide panel 30 is, for example, convex toward the interior. The reflection sheet 31 is attached below the light guide panel 30, in order to reflect and direct the light leaking downward from the light guide panel 30 toward the liquid crystal display panel 100.

Figure 5:
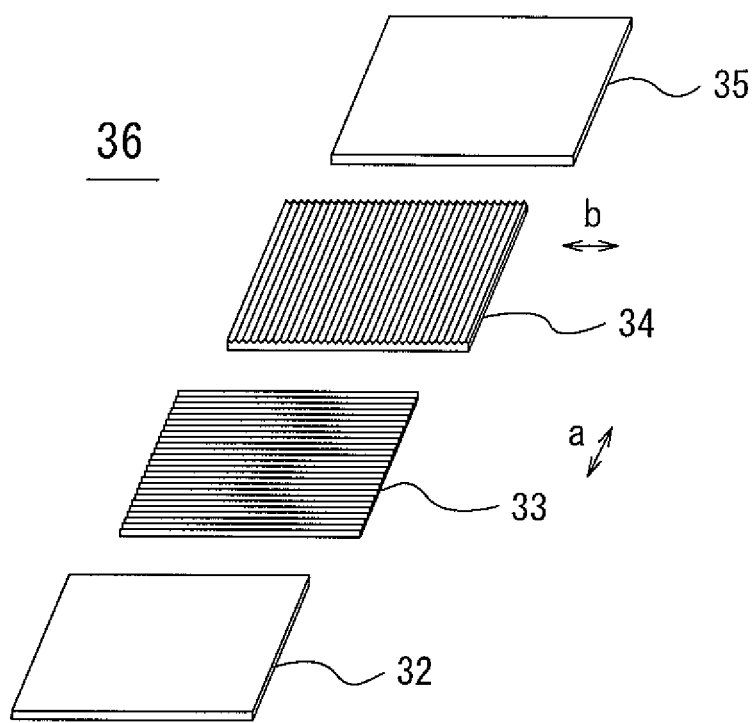
FIG. 5 is an exploded perspective view of optical sheets.

The optical sheets 36 are placed on the light guide panel 30. The optical sheets 36 includes the lower diffusion sheet 32, the lower prism sheet 33, the upper prism sheet 34, the upper diffusion sheet 35, which are laid on the light guide panel 30 in this order from the bottom. FIG. 5 is an exploded perspective view of the optical sheets 36. In FIG. 5, the lower diffusion sheet 32 is placed on the bottom of the optical sheets 36. The brightness of the light output to the side of the liquid crystal display device 100 varies such that the light is relatively bright near the light emitting diodes 50. The lower diffusion sheet 32 reduces the irregularity of the brightness to form a uniform backlight.

The lower prism sheet 33 is placed on the lower diffusion sheet 32. The lower prism sheet 33 is configured, for example, such that prisms, each having a triangular section and extending in the horizontal direction, are arranged in the vertical direction. The pitch of each prism is about 50 μm. In FIG. 5, the lower prism sheet 33 has a role to increase the use efficiency of the light spreading in the a direction, by directing the light in the direction perpendicular to the lower prism sheet 33.

The upper prism sheet 34 is placed on the lower prism sheet 33. The upper prism sheet 34 is configured, for example, such that prisms, each having a triangular section and extending in the vertical direction, are arranged in the horizontal direction. The pitch of each prism is about 50 μm. In FIG. 5, the upper prism sheet 34 has a role to increase the use efficiency of the light spreading in the b direction, by directing the light in the direction perpendicular to the upper prism sheet 34.

In FIG. 5, the upper diffusion sheet 35 is placed on the upper prism sheet 34. The upper diffusion sheet 35 has a role to prevent occurrence of moiré in the screen of the liquid crystal display device. In other words, the light output from the lower prism sheet 33 or the upper prism sheet 34 microscopically varies in brightness corresponding to the prism pitch on a periodic basis.

On the other hand, in the TFT substrate 10 of the liquid crystal display panel 100, for example, scan lines extending in the horizontal direction are arranged in the vertical direction. Thus, portions allowing light to pass through, and portions blocking light from passing through are periodically generated in the vertical direction by the scan lines. Further, image signal lines extending in the vertical direction are arranged in the horizontal direction. Thus, portions allowing light to pass through, and portions blocking light from passing through are periodically generated in the horizontal direction by the image signal lines.

As a result, light interference occurs between the light having passed through the lower prism sheet 33 and the upper prism sheet 34, and the TFT substrate 10 of the liquid crystal display panel 100, leading to the occurrence of moiré. The upper diffusion sheet 35 has a role to reduce the intensity of the light having passed through the prism sheets, reducing the interference with the scan lines or the image signal lines formed on the TFT substrate 10, and thereby preventing the occurrence of moiré.

Returning to FIG. 3, the optical sheets 36 are laid on the light guide panel 30. A distance of about 50 μm is provided between the upper diffusion sheet 35 on the top of the optical sheets 36, and the lower polarizing plate 11 of the liquid crystal display panel 100. This is to prevent scratches caused by friction between the lower polarizing plate 11 and the upper diffusion sheet 35.

In the above description, the four optical sheets 36 such as the lower diffusion sheet 32, the lower prism sheet 33, the upper prism sheet 34, and the upper diffusion sheet 35 are used. However, the optical sheets 36 are not limited to the ones described above. For example, the prism sheets are not necessarily used as long as the brightness can be assured. In this case, plural diffusion sheets, for example, three diffusion sheets are used as the optical sheets 36. Each diffusion sheet has a rough surface produced by, for example, dispersing particles on the surface, so that the particles serve as a kind of prism to direct the light toward the liquid crystal display panel 100. Further, with the rough surfaces produced as described above, it is possible to further increase the light diffusion effect.

Figure 6:
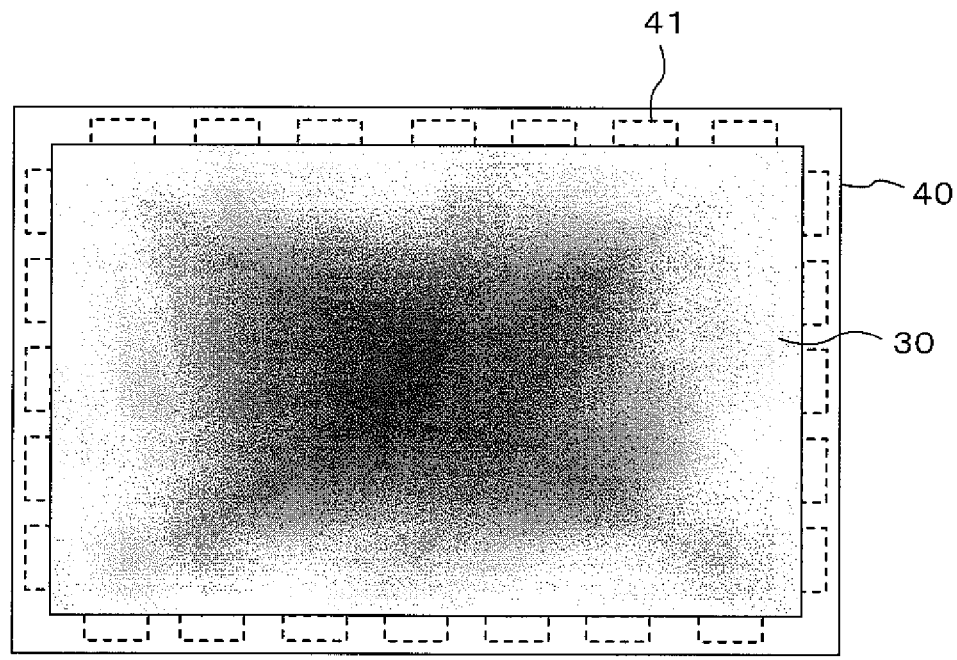
FIG. 6 is a top view of the brightness distribution of a liquid crystal display panel without using the present invention.

FIG. 6 is a schematic top view as seen from the top of the screen of the liquid crystal display device, in which the light emitting diodes 50 used as the light sources of the backlight are arranged at equal intervals on the sides of the light guide plate 30. As shown in FIG. 6, when the light emitting diodes 50 are arranged at equal intervals on the sides of the light guide plate 30, the brightness irregularity occurs such that the brightness decreases in particular in the center of the screen. That is, the light from the light emitting diodes 50 is supplied from the major and minor sides in the corner portions of the screen. However, the amount of light from the center of the major side or the center of the minor side, which greatly influences the brightness of the screen center, is smaller than the amount of light in the corner portion of the screen.

Figure 7:
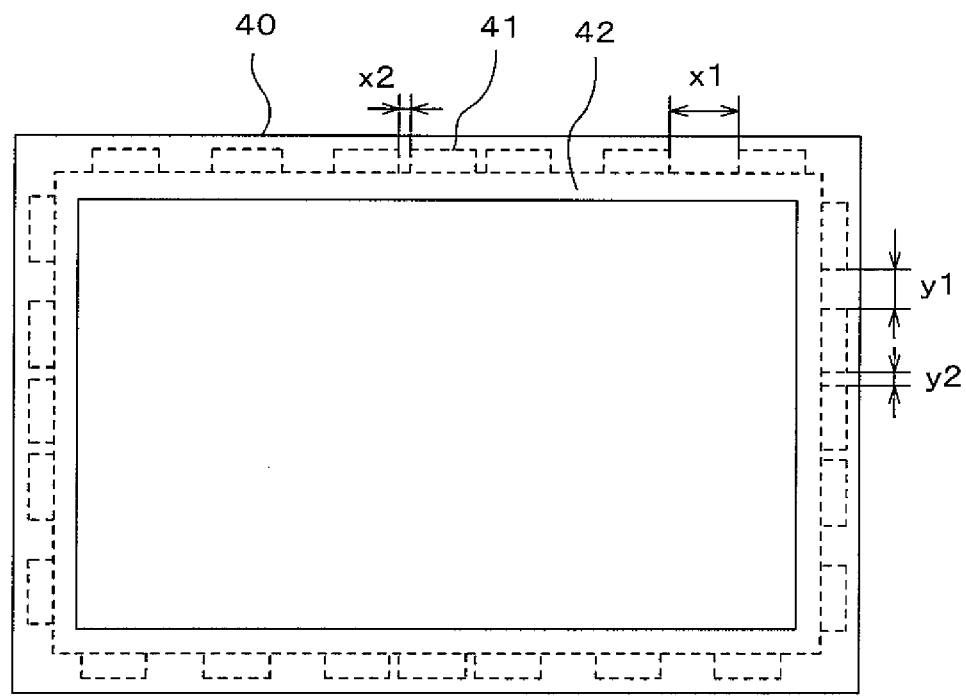
FIG. 7 is a top view of an example of the mold of the liquid crystal display device according to the present invention.

In this embodiment, in order to suppress such a brightness irregularity, the distances between the light emitting diodes 50 are not uniform in each side. FIG. 7 is an example of the configuration in which the light emitting diode housing portions 41 are unevenly arranged in the mold 40. FIG. 7 is a view as seen from the top of the mold 40 used in this embodiment, particularly showing the arrangement of the light emitting diode housing portions 41.

In FIG. 7, the step portion 42 is formed inside the mold 40 to place the liquid crystal display panel 100. The light emitting diode housing portions 41 are provided in the lower side of the step portion 42 in the direction perpendicular to the paper. There are provided seven light emitting diode housing portions 41 on the major side and five on the minor side, respectively. The distance between the light emitting diode housing portions 41 is x2 in the central portion of the major side, and x1 in the vicinity of the corner of the major side, where x1>x2. It is preferable that x2 is 80% or less of x1 for further efficiency. The distance between the light emitting diode housing portions 41 is y2 in the central portion of the minor side, and y1 in the vicinity of the corner of the minor side, where y1>y2. It is preferable that y2 is 80% or less of y1 for further efficiency.

The light emitting diodes 50 are housed in the light emitting diode housing portions 41. The arrangement density of the light emitting diodes 50 in the central portion of each side is increased in order to increase the brightness of the central portion of the screen, thereby reducing the irregularity of the brightness of the entire screen.

Figure 8:
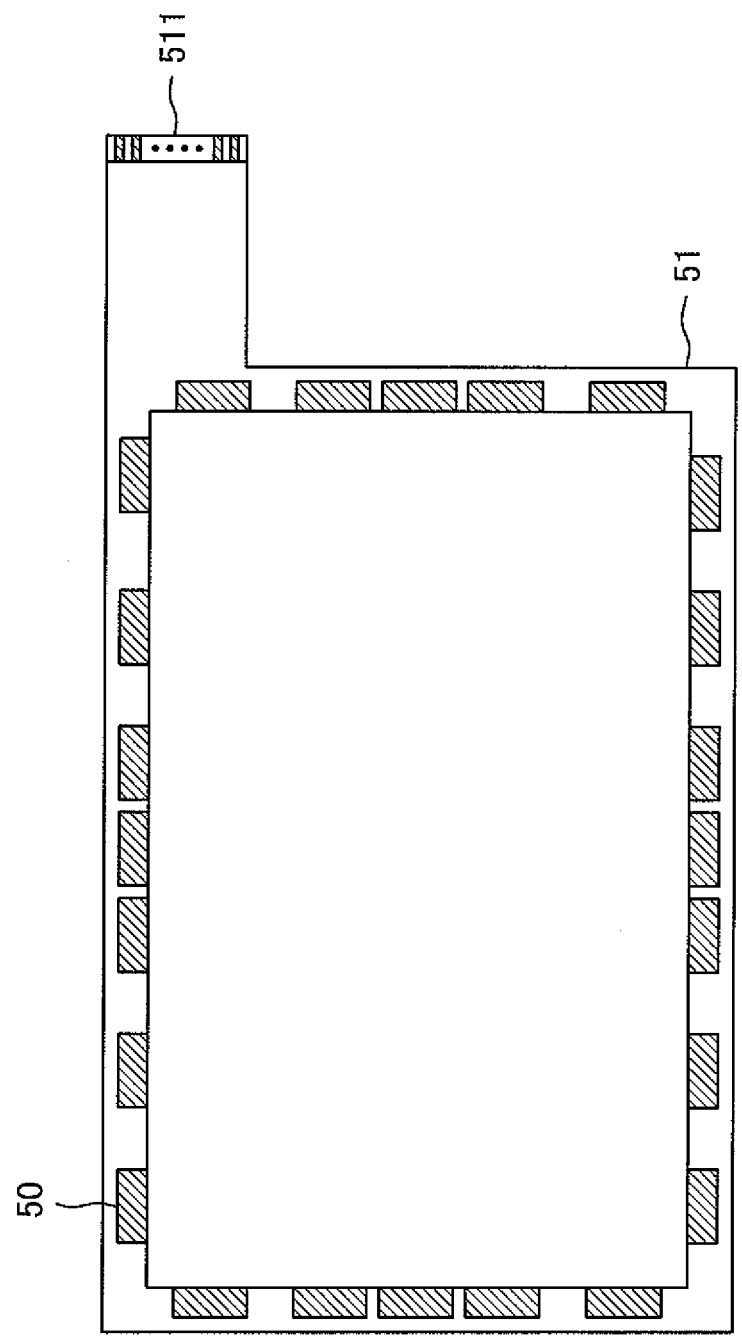
FIG. 8 shows an example of the arrangement of light emitting diodes in a flexible wiring substrate for the light emitting diodes.

FIG. 8 is a top view showing the state in which the light emitting diodes 50 are provided in the flexible wiring substrate 51 for the light emitting diodes 50. In FIG. 8, the base material of the flexible wiring substrate 51 is polyimide, and copper wiring is formed on the polyimide. The light emitting diodes 50 is supplied with a current, and the like, from a flexible wiring substrate terminal 511. The flexible wiring substrate 51 for the light emitting diodes 50 is formed in a frame shape with a hollow inside. The flexible wiring substrate 51 is bonded to the lower side of the mold 40 by an adhesive material and the like.

In FIG. 8, the plural light emitting diodes 50 are formed in the inner periphery of the flexible wiring substrate 51. The flexible wiring substrate 51 is provided on the lower side of the mold 40, and then the light emitting diodes 50 provided in the flexible wiring substrate 51 are housed in the light emitting diode housing portions 41 of the mold 40. In FIG. 8, the distance between the light emitting diodes 50 in the central portion of the major and minor sides is smaller than the distance in the corner portion of the major and minor sides. This allows the screen brightness to be uniform as described in FIG. 7.

Figure 9:
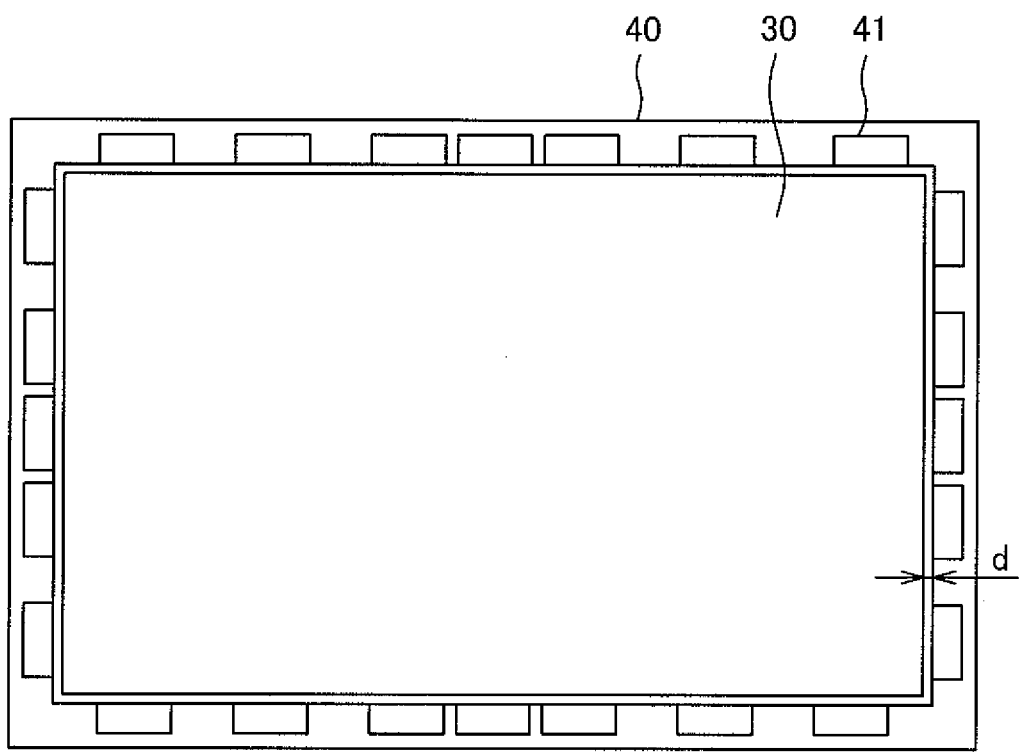
FIG. 9 is a back side view showing a state in which a light guide panel is inserted into the mold.

FIG. 9 is a back side view of the mold 40 in which the light guide panel 30 is inserted into the mold 40. In FIG. 9, there is a distance d between the light guide panel 30 and the inside of the mold 40. In general, taking into account the tolerance, the inner periphery of the mold 40 is made greater than the light guide panel 30 so that the light guide panel 30 can be inserted into the mold 40 without fail. In this embodiment, the inner periphery of the mold 40 is further increased to a value greater than the outer periphery of the light guide panel 30.

The mold 40 and the light guide panel 30 are both formed from polycarbonate, but the light guide panel 30 is formed by injection molding. The thermal expansion coefficient of the injection-molded plastic in the injection direction is about 10% higher than the thermal expansion coefficient in the direction perpendicular to the injection direction. When the mold 40 and the light guide panel 30 are closely fitted to each other, and when the temperature of the light guide panel 30 and the mold 40 increases due to heat produced by the light emitting diodes 50 during the operation, the thermal expansion coefficient of the light guide panel 30 may sometimes be higher than the thermal expansion coefficient of the inner diameter of the mold 40 in the direction in which the thermal expansion coefficient of the light guide panel 30 is large. In this case, the light guide panel 30 is deformed, changing the optical characteristics and resulting in such problems as irregularity and reduction of the brightness. In order to prevent such problems, in the present embodiment, the inner diameter of the mold 40 is made greater than the overall size of the light guide panel 30 in advance.

The thermal expansion coefficient of the polycarbonate forming the light guide panel 30 and the mold 40 is $7\times10^{-5}$. With T as the temperature increase in the light emitting diode housing portions 41 of the light guide panel 30 during the operation, a predetermined amount of the inner diameter of the mold 40 exceeding the overall size of the light guide panel 30 is $7\times10^{-5}$T×(the major axis of the light guide panel 30) or $7\times10^{-5}$T×(the minor axis of the light guide panel 30). Precisely speaking, the average temperature of the light guide panel 30 or the mold 40 should be used for the thermal expansion coefficient. In practice, however, there is no problem in using the temperature increase of the mold 40 in the light emitting diode housing portions 41 of the mold 40 during the operation as described above.

On the other hand, when the distance between the light emitting diodes 50 and the light guide panel 30 is increased, the use efficiency of the light from the light emitting diodes 50 greatly decreases. For example, some data shows that the increase in the distance by 0.1 mm between the light emitting diodes 50 and the light guide panel 30 reduces the screen brightness by 10%. From this point of view, it is preferable that the light emitting diodes 50 are firmly attached to the side surfaces of the light guide panel 30 as much as possible.

The light emitting diodes 50 are provided in the flexible wiring substrate 51 of polyimide. The thermal expansion coefficient of the polyimide is $4 \times 10^{-5}$, which is smaller than the thermal expansion coefficient of the polycarbonate forming the light guide panel 30. The temperature of the flexible wiring substrate 51 is higher than the average temperature of the light guide panel 30 during the operation. However, since the thermal expansion coefficient of the flexible wiring substrate 51 is smaller than the thermal expansion coefficient of the light guide panel 30, it is possible to avoid the phenomenon that the light emitting diodes 50 are separated from the side surfaces of the light guide panel 30.

As described above, on each side of the light guide panel 30, the light emitting diodes 50 are densely arranged in the central portion and discretely arranged in the corner portions. In this way, it is possible to obtain a display device with uniform brightness of the entire screen. Further, the outer diameter of the light guide panel 30 is made smaller than the inner diameter of the mold 40, while the thermal expansion coefficient of the material of the flexible wiring substrate 51, in which the light emitting diodes 50 are provided, is made smaller than the thermal expansion coefficient of the material forming the light guide panel 30. With this configuration, it is possible to prevent deformation of the light guide panel 30 during the operation, as well as the phenomenon that the light emitting diodes 50 are separated from the side surfaces of the light guide panel 30, thereby preventing the reduction in the brightness of the screen.

Although the foregoing description has focused on the case in which the material of the light guide panel is polycarbonate, acrylic resin may also be used to form a transparent light guide panel. As the thermal expansion coefficient of acrylic resin is substantially the same as that of polycarbonate, it is possible to apply the same concept as described above.

Second Embodiment

As described in the first embodiment, when the light emitting diodes 50 are provided on the four side surfaces of the light guide panel 30, there is a problem of the irregularity of the brightness in the display area 101. In this embodiment, the transmittance of light, which is defined by the pitch and width of the sub pixels in the display area 101 of the liquid crystal display panel 100, is changed in the central portion of the screen and in the periphery of the screen, in order to maintain the uniformity of the brightness of the display area 101. As shown in FIG. 6, in the configuration in which the light emitting diodes 50 are provided on the four sides of the light guide panel 30, the brightness of the central portion of the display area is equal to or less than 90% of the brightness of the periphery of the display area. Thus, it is preferable that the transmittance of the liquid crystal display panel, which is defined by the pitch and width of the sub pixels in the central portion of the display area, is 10% or more greater than the transmittance of the sub pixels in the periphery of the display area. The following shows various configurations to increase the transmittance in the central portion of the display area by 10% or more than the transmittance in the periphery of the display area.

Figure 10:
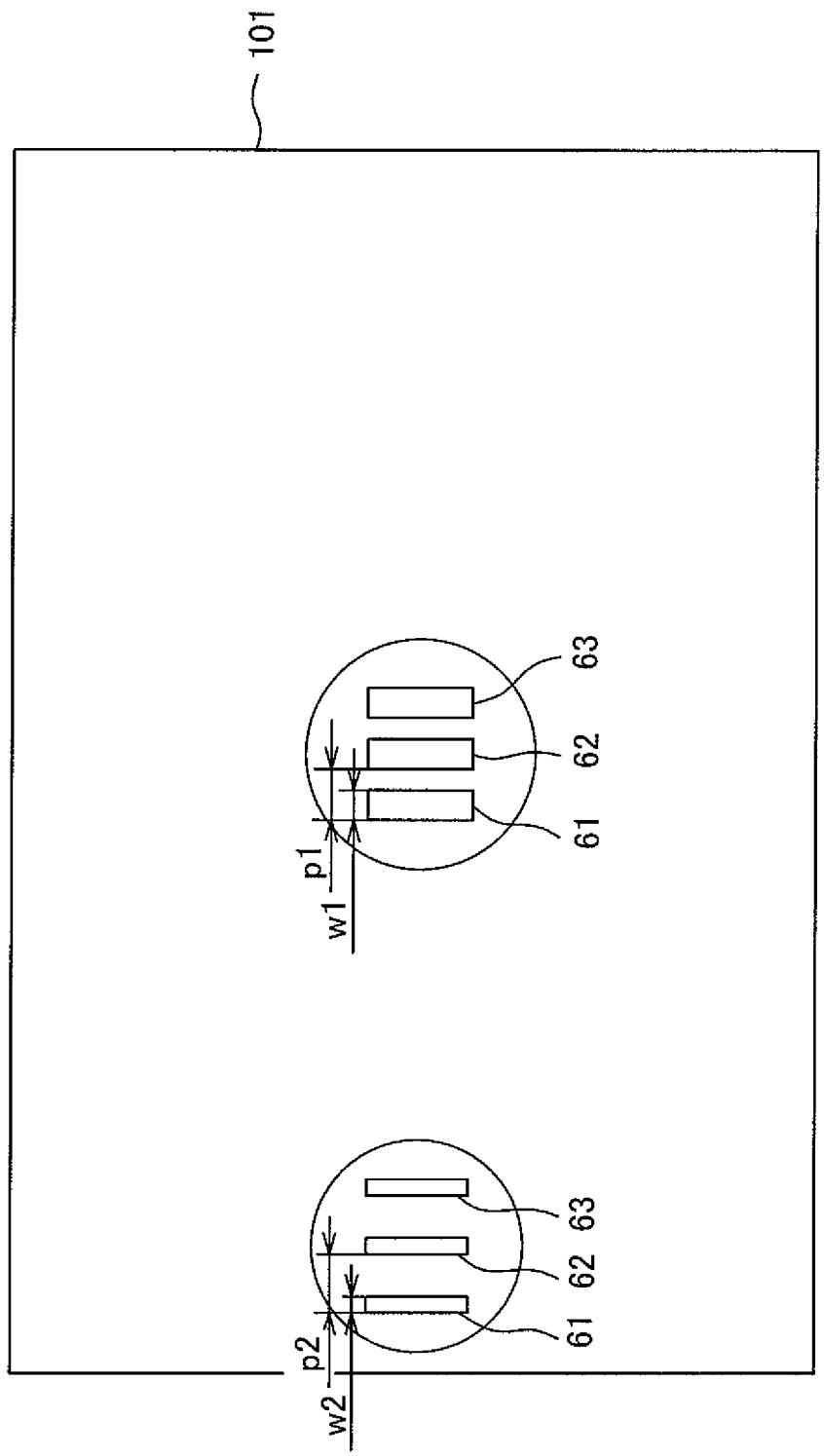
FIG. 10 shows an example of the pixel arrangement according to a second embodiment of the present invention.

FIG. 10 shows a first configuration of this embodiment. In FIG. 10, a red pixel 61, a green pixel 62, and a blue pixel 63, which are sub-pixels constituting a pixel, are arranged in the horizontal direction in the central portion of the display area 101. The pitch in the center of the pixel is p1, and the width of each sub pixel is w1. Each of the sub pixels is surrounded by black matrix to increase the image contrast.

In FIG. 10, a red pixel 61, a green pixel 62, and a blue pixel 63, which are sub pixels constituting a pixel, are arranged in the horizontal direction in the periphery of the display area 101. Pitch p2 in the center of the pixel is the same as the pitch p1 in the center of the pixel in the central portion of the display area. However, the width of each sub pixel, w2, is smaller than the width w1 of each sub pixel in the central portion of the display area.

As described above, the width of each sub pixel is increased in the central portion of the display area 101, while the width of each sub pixel is reduced in the periphery of the display area 101. Thus, the change in the brightness of the entire display area 101 can be reduced. In this case, the change in the width of each sub pixel over from the center to the periphery of the display area 101 can be defined by the relationship with the irregularity of the brightness due to the backlight.

Figure 11:
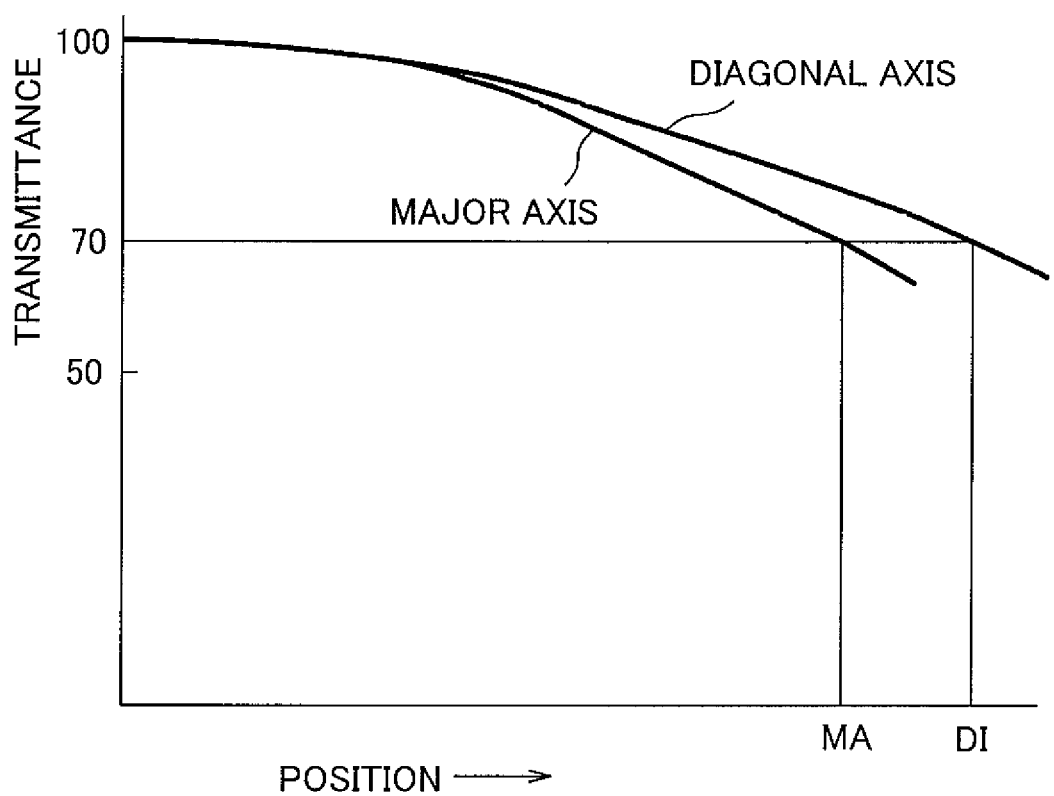
FIG. 11 shows an example of the transmittance of the pixels in the display area.

FIG. 11 shows an example in which the transmittance of the sub pixels is changed, for example, in controlling the brightness distribution shown in FIG. 6. In FIG. 11, the abscissa represents the distance from the center of the screen and the ordinate represents the transmittance of each pixel. In the abscissa of FIG. 11, MA is half the major axis and DI is half the diagonal axis. Since the brightness change in FIG. 6 is different in the major axis and in the diagonal axis, the transmittance of each sub pixel is changed in accordance with the brightness change.

In FIG. 11, the transmittance on the major axis is kept large and little changed in the vicinity of the center of the screen. In FIG. 11, the transmittance on the major axis is gradually reduced from a position about one-third of MA, or of half the major axis, so that the transmittance at the periphery of the major axis is about 70% of the transmittance at the center of the major axis.

Further, in FIG. 6, the change in the brightness on the diagonal axis is different from that on the major axis, in that the dark portion extends further from the central portion of the screen. In FIG. 11, in accordance with this, the change in the transmittance of each sub pixel on the diagonal axis is made smaller than the transmittance on the major axis. At the same time, similarly to the change in the transmittance on the major axis, the transmittance at the periphery of the diagonal axis is reduced to about 70% of the transmittance at the center of the diagonal axis.

Figure 12:
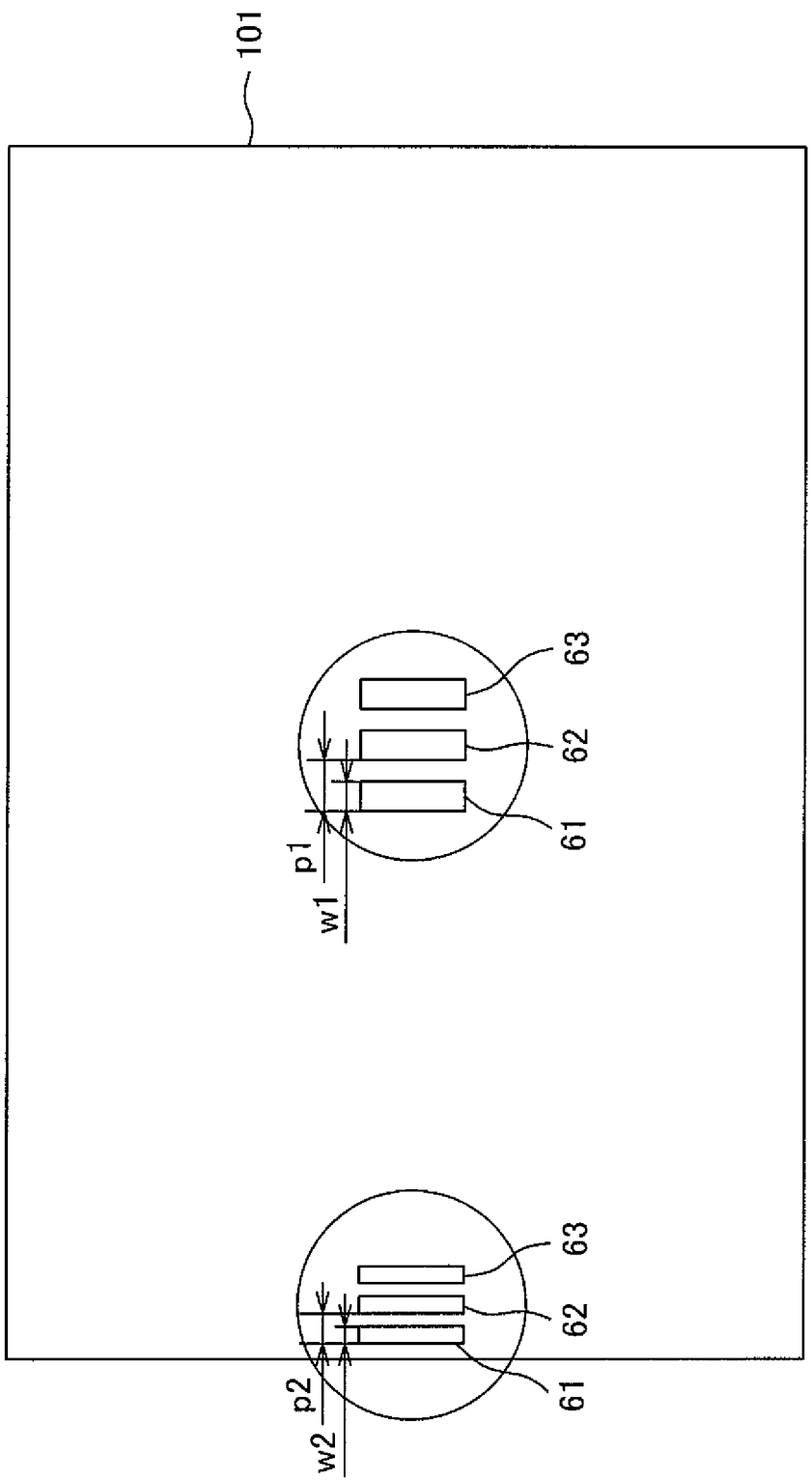
FIG. 12 shows another example of the pixel arrangement according to the second embodiment.

FIG. 12 shows a second configuration of this embodiment, in which the transmittance is changed by changing the width and pitch of the sub pixels in the display area 101. In this case, the image definition in the peripheral portion of the display area 101 is higher than in the central portion of the display area 101. The transmittance is changed in accordance with the brightness distribution to be corrected as described in FIG. 10. In other words, the brightness distribution in FIG. 6 can be corrected, for example, by adjusting the pitch and width of the sub pixels to obtain the transmittance distribution in FIG. 11.

The transmittance of the pixel can also be changed by increasing the pitch of the sub pixels in the peripheral portion of the display area 101, in reverse to that shown in FIG. 12. In this case, the width of the sub pixels can be constant. In this configuration, the image definition in the central portion of the display area 101 is higher than in the periphery of the display area 101. It should be noted that the width of the sub pixels can also be changed depending on the position according to the necessity.

As described above, according to this embodiment, it is possible to precisely control the brightness irregularity of the display area 101 in which the light emitting diodes 50 are provided on the four sides of the light guide panel 30, by changing the transmittance of the sub pixels. In this case, it is preferable to also use the configuration of the first embodiment in which the arrangement density of the light emitting diodes 50 is changed on each side of the light guide panel 30.

Third Embodiment

Figure 13:
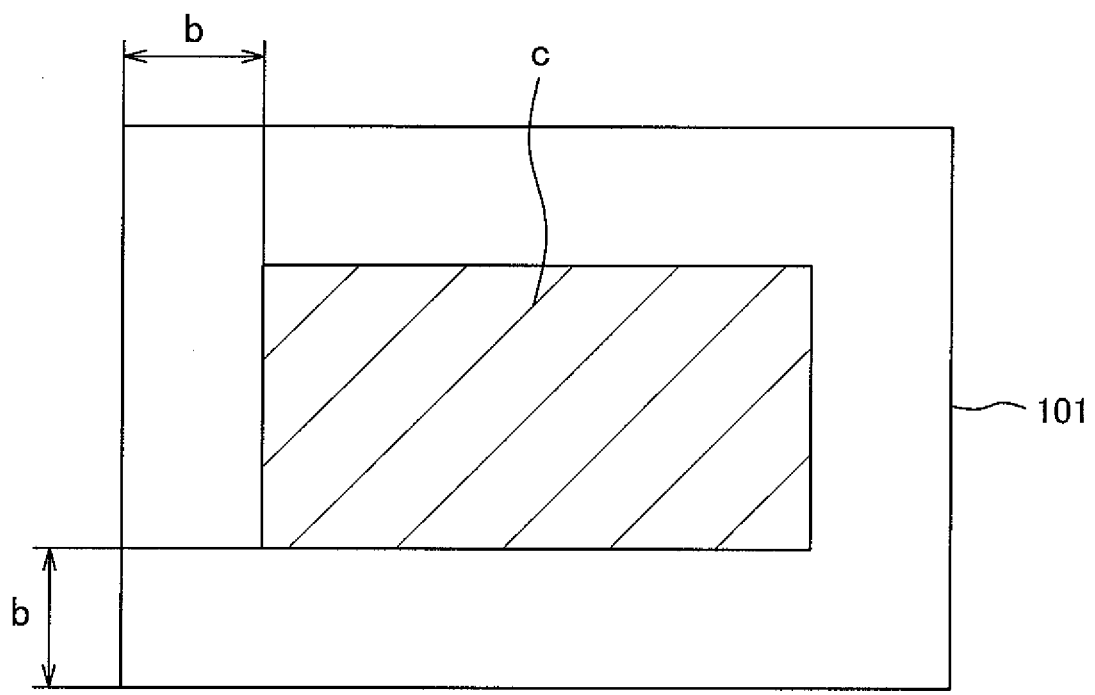
FIG. 13 shows another example of the brightness distribution of the liquid crystal display panel without using the present invention.

There may be a case in which the light from the light emitting diodes 50 only reaches a certain distance, depending on the characteristics of the light emitting diodes 50 mounted on the side walls of the light guide panel 30. FIG. 13 shows an example of such a case. In FIG. 13, the light from the light emitting diodes 50 only reaches a specific distance b both on the major and minor axes in the display area 101.

FIG. 13 shows an example in which the screen is extremely dark inside from the periphery of the display area 101 at the distance b in which a predetermined brightness is maintained. In such a case, it is necessary to actively guide the light from the light emitting diodes 50 to the vicinity of the center of the display area 101 by the light guide panel 30.

Figure 14:
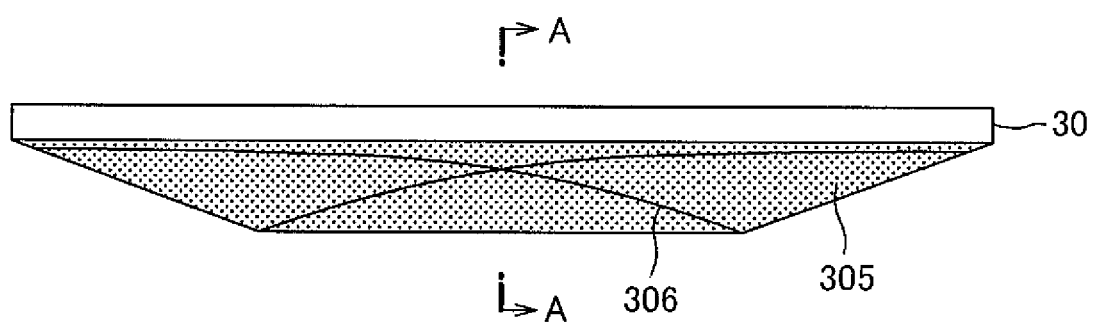
FIG. 14 is an exemplary perspective view of the light guide panel used in a third embodiment of the present invention.

FIG. 14 is a perspective view as seen from the back side direction of the light guide panel 30. In FIG. 14, a back surface 305 of the light guide panel 30 has a shape convex toward the interior thereof. This state is shown by an envelope 306. When microscopically observing the back surface 305 of the light guide panel 30, a special surface is formed with the angle gradually changed. The envelop 306 is a curve connecting points where the angle is gradually changed.

Figure 15:
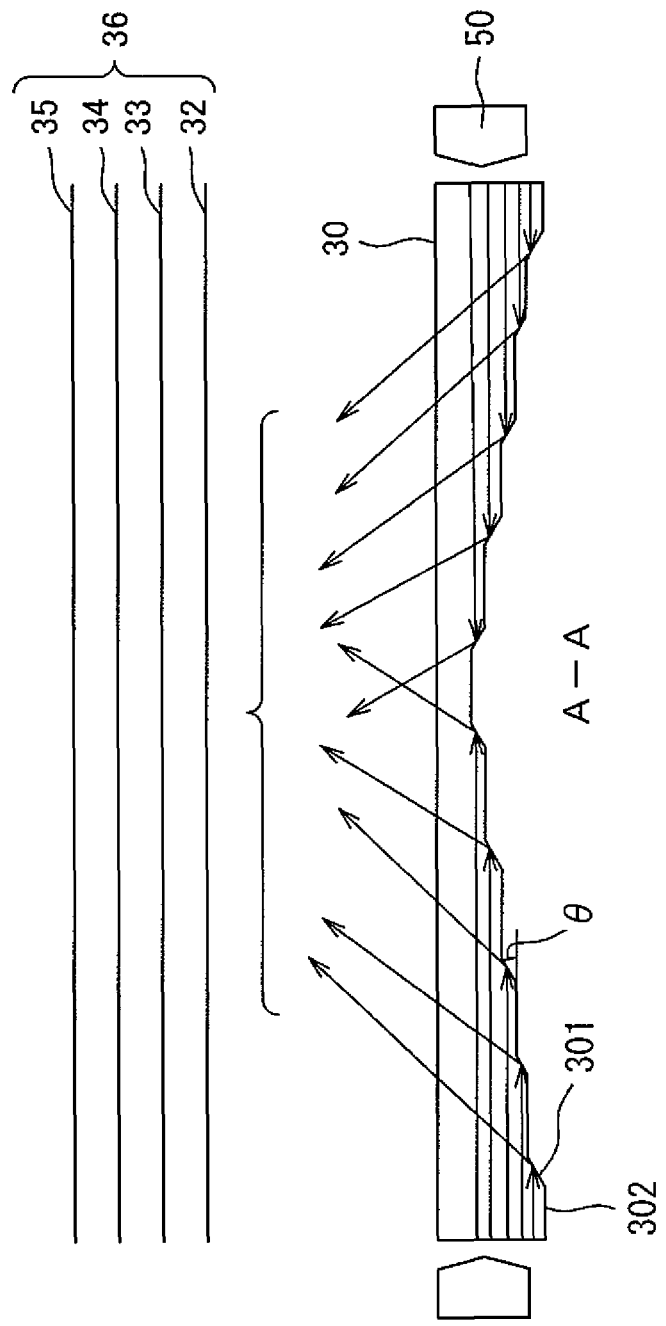
FIG. 15 is a schematic cross-sectional view showing the motion of the third embodiment.

FIG. 15 is a schematic view showing the cross section of the light guide panel 30 in a certain direction, for example in the minor axis direction, as well as the state in which the light emitting diodes 50 are mounted on the side surfaces of the light guide panel 30. In the upper portion of FIG. 15, there are further provided the optical sheets 36, such as lower diffusion sheet 32, the lower prism sheet 33, the upper prism sheet 34, and the upper diffusion sheet 35. In FIG. 15, the light emitting diodes 50 are provided on both side surfaces of the light guide panel 30. Plane surfaces 302 and inclined surfaces 301 are alternately formed on the back surface of the light guide panel 30. The angle θ of the inclined surface 301 gradually increases from the periphery toward the center of the light guide panel 30. However, the angle θ does not exceed 45 degrees.

In FIG. 15, the lights incident from the light emitting diodes 50 shoot the different inclined surfaces 301 depending on the light incident positions of the side surfaces of the light guide panel 30. In other words, the incident light going straight along the relatively lower side of the side surface of the light guide panel 30 is reflected by the inclined surface 301 formed in the periphery of the light guide panel 30. The incident light going straight along the relatively upper side of the side surfaces of the light guide panel 30 is reflected by the inclined surface 301 formed in the relative center of the light guide panel 30. Here, since the angle of the inclined surface 301 is not more than 45 degrees, the incident lights going straight to the inclined surfaces 301 are totally reflected, all going to the side of the optical sheets 36, namely, to the side of the liquid crystal display panel 100.

As described above, by using the light guide panel 30 as shown in FIGS. 14 and 15, it is possible to direct the lights incident from both sides of the light guide panel 30, toward the central portion of the display area 101. As a result, the brightness irregularity shown in FIG. 13 can be eliminated. Thus, it is possible to obtain a screen with uniform brightness.

Incidentally, in the schematic view of FIG. 15, it seems that the periphery portion of the screen becomes rather dark as all the lights from the light emitting diodes 50 go to the central portion of the screen, but this does not actually happen. In other words, the lights from the light emitting diodes 50 are not all going in the horizontal direction, but some lights are input to the light guide panel 30 with a certain angle with respect to the horizontal direction. Such lights are reflected in the inclined surfaces 301 as well as in the plane surfaces 302. As a result, the diffuse reflection surface is macroscopically large, so that the lights from the light emitting diodes 50 sufficiently reach the peripheral portion of the display area 101. Thus, it is possible to obtain a screen with uniform brightness.

In the light guide panel 30 shown in FIGS. 14 and 15, when the curve of the envelop 306 on the back surface of the light guide panel 30 is set to achieve perfectly uniform screen brightness, the shape of the curve is very complex. The design process and the accuracy verification for producing the light guide panel 30 are complicated. This may lead to a problem of cost effectiveness.

Figure 16A:
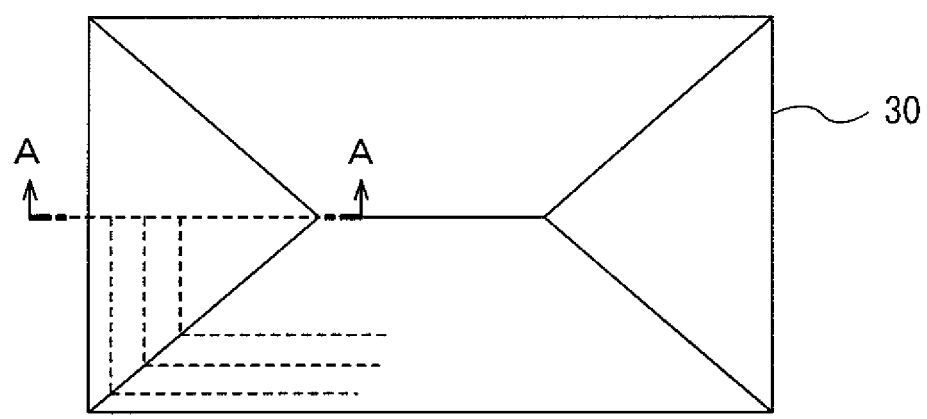
FIG. 16A is a back side view of another example of the light guide panel used in the third embodiment.
Figure 16B:
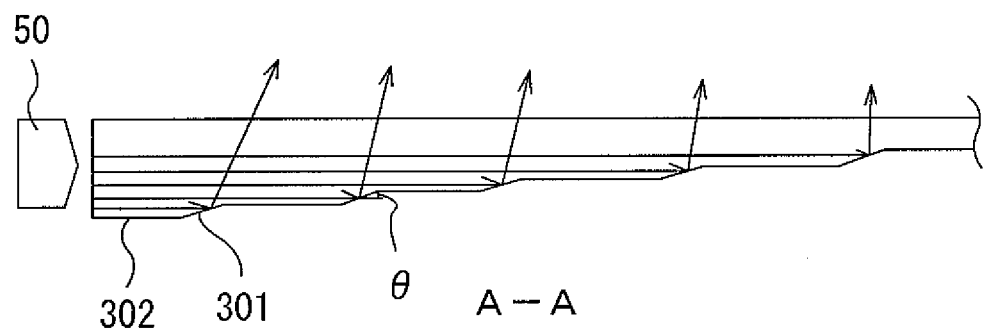
FIG. 16B is a schematic cross-sectional view showing the motion of the light guide panel shown in FIG. 16A.

FIGS. 16A and 16B show an example of the light guide panel 30, in which the above problem is solved, enabling simple design and production of the light guide panel 30 to achieve uniform screen brightness. FIG. 16A is a back side view of the light guide panel 30 designed for this purpose. FIG. 16B is a cross-sectional view of FIG. 16A. Incidentally, the light emitting diode 50 is provided on the side in FIG. 16B.

As shown in FIGS. 16A and 16B, the light guide panel 30 has a shape convex toward the interior thereof. The interior shape is a square pyramid with a linear top edge. In FIG. 16A, the dotted lines represent the contour lines. Each surface of the square pyramid is a plane surface, so that the design and production of the light guide panel 30 are very easy. It is allowed that the screen brightness is practically uniform even if it is not ideally uniform.

FIG. 16B is a cross-sectional view along line A-A of FIG. 16A. As shown in FIG. 16B, the lower surface of the light guide panel 30 is formed by alternately providing the plane surfaces 302 and the inclined surfaces 301. The inclination angle θ of the inclined surfaces 301 gradually increases as approaching the central portion of the light guide panel 30 from the periphery thereof. However, the inclination angle θ of the inclined surfaces 301 does not exceed 45 degrees even in the vicinity of the central portion of the light guide panel 30.

Thus, as described in FIGS. 14 and 15, the lights input from the light emitting diodes 50 in the horizontal direction are directed toward the central portion of the display area 101 of the liquid crystal display panel 100. Incidentally, in FIG. 16B, the envelop 306 of the connecting portions between the inclined surfaces 301 and the plane surfaces 302 is a straight line.

Further, of the lights from the light emitting diodes 50, lights other than those input in the direction perpendicular to the side surfaces of the light guide panel 30 are reflected also in the plane surfaces 302 on the lower side of the light guide panel 30. For this reason, the peripheral portion of the screen is not dark. As described above, when the back surface of the light guide panel 30 is formed in a square pyramid shape by four plane surfaces with a linear top edge, it is possible to achieve practically uniform screen brightness.

What is claimed is:
1. A liquid crystal display device comprising:

a liquid crystal display panel;
a backlight; and
a housing member for housing the liquid crystal display panel and the backlight;
wherein the backlight includes a substantially rectangular shaped light guide panel having four sides in which a plurality of light emitting diodes are provided on each of the four sides of the light guide panel;
wherein a distance between the light emitting diodes in a central portion of each of the four sides, is smaller than the distance between the light emitting diodes in the vicinity of corners of each of the four sides; and
wherein a back surface of the light guide panel is convex toward the interior thereof, in which plane surfaces and inclined surfaces are alternately formed with an angle between the inclined surface and the plane surface being less than 45 degrees.

2. The liquid crystal display device according to claim 1, wherein the distance between the light emitting diodes in the central portion of each of the four sides is equal to or less than 80% of the distance between the light emitting diodes in the vicinity of the corners of each of the four sides.

3. The liquid crystal display device according to claim 1, wherein the light guide panel is housed in the housing member, in which a plurality of light emitting diode housing portions are formed on each side of the inside of the housing member to house the light emitting diodes.

4. The liquid crystal display device according to claim 1, wherein the light emitting diodes are provided in a frame-like flexible wiring substrate delimiting a substantially rectangular shaped opening having four sides, in which the plurality of the light emitting diodes are provided on a surface of the flexible wiring substrate at positions adjacent all four sides of the opening.

5. The liquid crystal display device according to claim 4, wherein a thermal expansion coefficient of a base material of the flexible wiring substrate is smaller than a thermal expansion coefficient of the light guide panel.

6. The liquid crystal display device according to claim 2, wherein, when T is a temperature increase in the light emitting diode housing portions of the housing member during operation, a distance between the light guide panel and the housing member is equal to or more than $7 \times 10^{-5} T \times$(a length of a major axis of the substantially rectangular shaped light guide panel), or $7 \times 10^{-5} T \times$(a length of minor axis of the substantially rectangular shaped light guide panel).

7. The liquid crystal display device according to claim 1, wherein an envelope of intersections between the inclined surfaces and the plane surfaces in a cross section of the light guide panel is a straight line.

* * * * *